US009162344B2

(12) United States Patent
Bajaj

(10) Patent No.: US 9,162,344 B2
(45) Date of Patent: Oct. 20, 2015

(54) METHOD AND APPARATUS FOR CMP CONDITIONING

(71) Applicant: Rajeev Bajaj, Fremont, CA (US)

(72) Inventor: Rajeev Bajaj, Fremont, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 13/785,845

(22) Filed: Mar. 5, 2013

(65) Prior Publication Data

US 2013/0189906 A1 Jul. 25, 2013

Related U.S. Application Data

(63) Continuation of application No. 12/636,644, filed on Dec. 11, 2009, now Pat. No. 8,398,463, and a continuation-in-part of application No. 11/369,876, filed on Mar. 6, 2006, now Pat. No. 7,762,871.

(60) Provisional application No. 60/659,384, filed on Mar. 7, 2005.

(51) Int. Cl.
*B24B 1/00* (2006.01)
*B24B 53/017* (2012.01)
*B23K 26/00* (2014.01)
*B24B 53/095* (2006.01)

(52) U.S. Cl.
CPC ............ *B24B 53/017* (2013.01); *B23K 26/0075* (2013.01); *B24B 53/095* (2013.01)

(58) Field of Classification Search
USPC ................................................ 451/28, 41, 56
See application file for complete search history.

(56) References Cited

U.S. PATENT DOCUMENTS

| 5,212,910 | A |   | 5/1993 | Breivogel et al.              |
|-----------|---|---|--------|-------------------------------|
| 5,216,843 | A | * | 6/1993 | Breivogel et al. ..... 451/285 |
| 5,489,233 | A |   | 2/1996 | Cook et al.                   |
| 5,607,346 | A |   | 3/1997 | Sexton                        |
| 5,609,517 | A |   | 3/1997 | Lofaro                        |
| 5,795,218 | A |   | 8/1998 | Doan et al.                   |
| 5,893,976 | A |   | 4/1999 | Bauer                         |
| 5,900,164 | A | * | 5/1999 | Budinger et al. ...... 216/88  |

(Continued)

FOREIGN PATENT DOCUMENTS

JP        2001071256 A    3/2001

OTHER PUBLICATIONS

Bajaj, Rajeev, PCT/US05/35660 filed Oct. 5, 2005, International Search Report and Written Opinion, Jun. 15, 2007, 8pp, International Searching Authority-US, Alexandria, Virginia.

(Continued)

*Primary Examiner* — Lee D Wilson
*Assistant Examiner* — Shantese McDonald
(74) *Attorney, Agent, or Firm* — Patterson & Sheridan, LLP

(57) ABSTRACT

A polishing pad conditioning apparatus includes a laser beam generating unit for providing a laser beam, a fluid delivery system for providing a fluid stream and a vacuum line for removing debris. The laser beam may directly impinge on a surface of a polishing pad thereby creating cutting action, while an atomized fluid stream provides cooling and pad debris along with fluid are removed thru the vacuum line. Alternatively, the laser beam may be combined with the atomized fluid stream in a region above the pad surface to substantially impart part of its energy to the fluid stream, generating high energy droplets which provide "cool" cutting action on the pad surface.

21 Claims, 3 Drawing Sheets

(56) References Cited

U.S. PATENT DOCUMENTS

| | | | |
|---|---|---|---|
| 6,019,666 | A | 2/2000 | Roberts et al. |
| 6,024,630 | A | 2/2000 | Shendon et al. |
| 6,089,965 | A | 7/2000 | Otawa et al. |
| 6,090,475 | A | 7/2000 | Robinson et al. |
| 6,498,101 | B1 * | 12/2002 | Wang .................. 438/691 |
| 6,612,916 | B2 | 9/2003 | Kollodge et al. |
| 6,794,605 | B2 * | 9/2004 | Park et al. ............ 219/121.69 |
| 6,962,524 | B2 | 11/2005 | Butterfield et al. |
| 6,986,705 | B2 | 1/2006 | Preston et al. |
| 7,020,306 | B2 | 3/2006 | Hirose et al. |
| 7,070,479 | B2 * | 7/2006 | Faustmann et al. ......... 451/21 |
| 7,192,340 | B2 | 3/2007 | Ono et al. |
| 7,258,600 | B1 | 8/2007 | Benner |
| 2001/0035354 | A1 | 11/2001 | Ashjaee et al. |
| 2001/0039175 | A1 | 11/2001 | Golzarian |
| 2002/0173255 | A1 | 11/2002 | Shendon |
| 2003/0132120 | A1 | 7/2003 | Emesh |
| 2003/0153245 | A1 | 8/2003 | Talieh |
| 2003/0209528 | A1 | 11/2003 | Choo |
| 2004/0110381 | A1 | 6/2004 | Yoshida |
| 2004/0166779 | A1 | 8/2004 | Aldrich |
| 2004/0232121 | A1 | 11/2004 | Kim |
| 2006/0079159 | A1 | 4/2006 | Economikos |
| 2008/0016689 | A1 | 1/2008 | Bergstrom |
| 2008/0146119 | A1 | 6/2008 | Shintaro |

OTHER PUBLICATIONS

Bajaj, Rajeev, PCT/US05/35732 filed Oct. 5, 2005, International Search Report and Written Opinion, Nov. 28, 2006, 6pp, International Searching Authority-US, Alexandria, Virginia.

Bajaj, Rajeev, PCT/US05/35978 filed Oct. 5, 2005, International Search Report and Written Opinion, Mar. 15, 2006, 10pp, International Searching Authority-US, Alexandria, Virginia.

Bajaj, Rajeev, PCT/US05/35979 filed Oct. 5, 2005, International Search Report and Written Opinion, Feb. 24, 2006, 8pp, International Searching Authority-US, Alexandria, Virginia.

Bajaj, Rajeev, PCT/US05/35660 filed Oct. 5, 2005; International Preliminary Report on Patentability; WIPO; Jul. 19, 2007; 6pp.

Bajaj, Rajeev, PCT/US05/35732 filed Oct. 5, 2005; International Preliminary Report on Patentability; WIPO; Jun. 7, 2007; 5pp.

Bajaj, Rajeev, PCT/US05/35978 filed Oct. 5, 2005; International Preliminary Report on Patentability; WIPO; Jun. 7, 2007; 7pp.

Bajaj, Rajeev, PCT/US05/35979 filed Oct. 5, 2005; International Preliminary Report on Patentability; IPE/US; Sep. 27, 2006; 7pp.

Synova, Technology Introduction, Website, Jun. 6, 2013, http://www.synova.ch/technology/introduction/.

* cited by examiner

METHOD AND APPARATUS FOR CMP CONDITIONING

CROSS-REFERENCE TO RELATED APPLICATIONS

This application is a continuation of U.S. patent application Ser. No. 12/636,644, filed Dec. 11, 2009 (now U.S. Pat. No. 8,398,463) which is a continuation-in-part of U.S. patent application Ser. No. 11/369,876, filed Mar. 6, 2006 (now U.S. Pat. No. 7,762,871), which claims benefit of U.S. Provisional Application Ser. No. 60/659,384 filed Mar. 7, 2005, all of which are incorporated herein by reference.

BACKGROUND OF THE INVENTION

1. Field of the Invention

The present invention relates to the field of chemical mechanical planarization (CMP) and relates specifically to CMP pad conditioning apparatus and method of use.

2. Description of the Related Art

In modern integrated circuit (IC) fabrication, layers of material are applied to embedded structures previously formed on semiconductor wafers. Chemical mechanical planarization (CMP) is an abrasive process used to remove these layers and polish the surface of a wafer to achieve the desired structure. CMP may be performed on both oxides and metals and generally involves the use of chemical slurries applied in conjunction with a polishing pad in motion relative to the wafer (e.g., pad rotation relative to the wafer). The resulting smooth flat surface is necessary to maintain the photolithographic depth of focus for subsequent processing steps and to ensure that the metal interconnects are not deformed over contour steps. Damascene processing requires metal, such as tungsten or copper, to be removed from the top surface of dielectric using CMP to define interconnect structures.

Polishing pads are typically made of urethanes either in cast form (and filled with micro-porous elements) or from nonwoven felt coated with polyurethanes. During polishing, the pad surface undergoes deformation due to polishing forces. The pad surface therefore has to be "regenerated" through a conditioning process.

Conventional conditioning processes involve pressing a fine diamond covered disc against the pad surface while pad is rotated much like during polish process. One of the issues with diamond conditioning disks is that diamonds tend to lose their sharpness over time. The process is accelerated when diamond conditioning is used during wafer processing, as slurry chemicals tend to accelerate the wear.

Another problem with diamond conditioners is the attendant risk of diamonds getting loose and falling onto the pad. This can lead to severe damage to the semiconductor wafer resulting in loss of product. Further, diamond conditioners tend to be expensive and have a finite lifespan, therefore needing to be replaced after predetermined usage.

Hence, there exists a need for conditioning apparatus that does not suffer from disadvantages such as those discussed above and that provides repeatable performance at relatively low cost.

SUMMARY OF THE INVENTION

A polishing pad conditioning apparatus and method is described. The apparatus includes a laser beam generating unit and a system to transmit or focus the laser beam. The laser beam generating unit, or in some cases only the beam delivery unit, is mounted on a conditioning arm, such that the laser beam may be directed perpendicular to the plane of the polishing pad, which is next to a polishing platen. The conditioning arm is capable of moving across the polishing table to scan the pad radius, allowing the laser to traverse the pad radius. The beam is incident on the pad, creating a local deformation, the depth and shape of the deformation depends on the beam spot size and power. The beam may be traversed across the pad in a predetermined trajectory creating a desired micro grooving pattern. As the conditioning unit is traversed across the polish platen, onto which the polishing pad is mounted, the platen is rotated thereby allowing the beam to cover the entire pad. The rotation speed of the pad, traversing speed of the laser conditioning head, and rotation speed of the laser head unit itself can be varied to provide the desired micro groove pattern.

In varying embodiments of the present invention, the laser beam is mounted off-center from the conditioning head and is capable of rotation, which when combined with the pad rotation and traversing motion of the conditioning unit, can create multiple micro grooving patterns. In yet another embodiment, multiple beam units may be mounted on the conditioning head enabling multiple points to create the micro grooving texture rapidly and more uniformly.

In other embodiments, the laser beam may impinge the pad at a non-normal angle. This creates an angled microgroove pattern, which may be desirable in certain cases.

Various other embodiments of the present invention provide a polishing pad conditioning system, having a laser beam generation unit coupled to provide a laser beam via a fiber optic transmission and focusing unit; an atomized fluid delivery line coupled to direct a fluid stream proximate a vicinity at which the laser beam exiting the fiber optic transmission and focusing unit will be incident on a target; and a vacuum line coupled to remove fluid and debris from the vicinity at which the laser will be incident on the target.

Alternative embodiments of the invention provide a polishing pad conditioning system, having a laser beam generation unit coupled to provide a laser beam via a fiber optic transmission and focusing unit; an atomized fluid delivery line coupled to deliver a fluid into an interaction zone within a conditioning head of the polishing pad conditioning system and thru which the laser beam also passes; and a vacuum line coupled to remove fluid and debris from a vicinity at which the laser will be incident on a target.

Still further embodiments of the invention provide a polishing pad conditioning head, having a beam delivery unit, a fluid delivery unit and a vacuum line, each mounted on a pad conditioning arm that is adjacent a polishing table, the pad conditioning arm configured to traverse a radius of a polishing pad mounted on the polishing table.

In various embodiments of the invention, the laser beam delivery unit and the fluid delivery unit may be mounted separately from each other and/or mounted so that a laser beam produced by the laser beam delivery unit and a fluid stream produced by the fluid delivery unit are combined within the conditioning head prior to impinging upon a surface of the polishing pad. The fluid delivery line may be coupled to a fluid delivery system that uses compressed air. The laser beam generation unit may include an Er, Cr:YSGG laser or $CO_2$ laser and the fluid delivery line may be coupled to a fluid delivery system configured to deliver deionized water, a pad cleaning solution, an acidic solution, a basic solution, or a film polish solution.

A further embodiment of the invention involves bringing a polishing pad conditioning head of a polishing pad conditioning apparatus in close proximity to a polishing pad surface while the polishing pad is being used to polish a wafer by pressing the wafer against the polishing pad, the polishing pad conditioning apparatus providing at least one laser beam and a fluid stream directed at the polishing pad and a vacuum for removing debris from a vicinity of the polishing pad near the polishing pad conditioning head, whereby surface micro grooves on the polishing pad are continually refreshed by action of the polishing pad conditioning head while the polishing pad polishes the wafer.

These and other features of the present invention are described in greater detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The present invention is illustrated by way of example, and not limitation, in the figures of the accompanying drawings, in which.

DETAILED DESCRIPTION

Figure 1A:
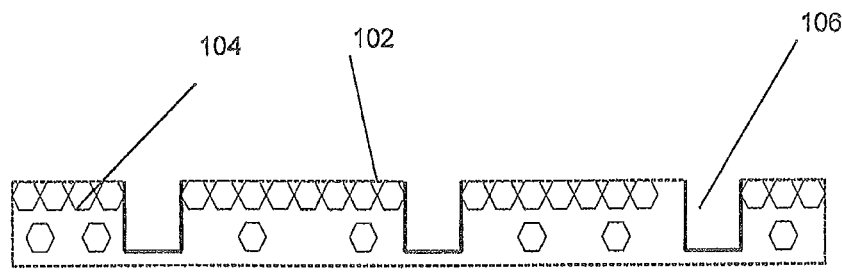
FIG. 1A illustrates a side cutaway view of a polishing pad.

The present invention relates to the design and method of a non-contact polishing pad conditioning unit. The design involves a laser beam generating unit, and beam transmission and delivery optics as necessary. Additional lines to supply liquid(s), typically water, air and vacuum are also provided. The entire unit (e.g., a laser conditioning head), including the beam delivery hardware and atomized fluid and vacuum lines, is mounted on a movable arm capable of traversing the radius of the polishing pad, which is itself mounted on a polishing table. In some cases the laser-conditioning head may be mounted such that the beam is off-center on the conditioning head, which is capable of rotating. A rotating beam thus impinges on the pad surface creating circular grooving patterns. This, when coupled with pad rotation and traversing the beam across the radius of the pad, creates a micro groove pattern across the entire pad surface.

It is possible to use several types of laser units in this application such as a $CO_2$ laser, diode lasers, an Nd—YAG laser, etc. Typical $CO_2$ lasers used to cut or engrave plastics are in the range of 10-50 Watts. Pad conditioning may be accomplished with lasers as low as 1 Watt.

Another aspect of conditioning is that the polishing pads are wet during processing. $CO_2$ lasers have wavelengths of 10.6 microns, which make them well suited for transmitting energy to water molecules. Lasers with lower wavelengths may also be used. When a laser is incident on a wet polishing pad, water heats up instantaneously and boils off, rupturing the pad's polymer surface with it. This process, in combination with the ability to cut the polymer surface itself, creates a unique microgroove texture on the pad surface. The laser may be coupled with water/fluid, which may be optionally atomized, to provide a beam thru the fluid. The atomized fluid stream serves several purposes. For example, the liquid provides a cooling aspect to the surface being impinged with the laser beam by absorbing some of the energy of the laser beam, and the atomized droplets can provide a "cooler" cutting action, thereby eliminating a burr/burn effect. A vacuum line enables removal of fluid and pad debris. Different fluids may be employed depending on the process and film being polished, for example in the case of a copper polishing process, the fluid may be a pad cleaning solution such as Electraclean™ from Applied Materials, Inc. of Santa Clara, Calif., or a copper polishing solution. In the case of an oxide polishing process, fluids with a pH approximately equal to the pH of the oxide polish slurry may be used.

Use of a laser conditioning system solves several problems. Most notably, the pad conditioning process becomes very repeatable and stable. By eliminating diamond conditioning discs, the risk of diamond loss is eliminated. This failure mode causes scratches on the product wafers resulting in catastrophic product loss and equipment down time. Also, the use of lasers provides a repeatable, long lasting and low cost method of producing micro grooving on a polishing pad surface, eliminating the diamond conditioning disc, which is an expensive consumable with a short life.

Figure 1B:
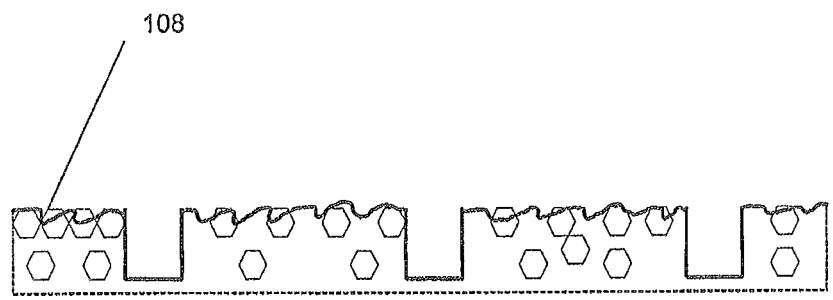
FIG. 1B shows the surface of the polishing pad illustrated in FIG. 1A after polishing.
Figure 1C:
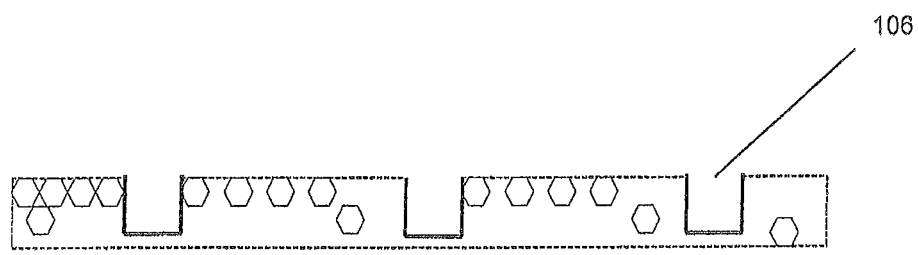
FIG. 1C shows the surface of the polishing pad illustrated in FIG. 1B after a conditioning process has been completed.

FIG. 1A illustrates a side cutaway view of a polishing pad. Polishing pad 102 contains microelements 104, and grooves 106, much like commercial polishing pads such as the IC1000 of Rhom & Haas, Inc. FIG. 1B shows the surface of polishing pad 102 after polishing. The top surface of the pad shows degradation 108, especially around the microelements where the edges are degraded due to plastic or viscous flow of the bulk urethane material. FIG. 1C shows the surface of polishing pad 102 after the conditioning process has been completed. Conditioning accomplishes two things, it wears off the top degraded surface and also recreates the microgrooves 106 to aid in slurry transport.

Figure 2A:
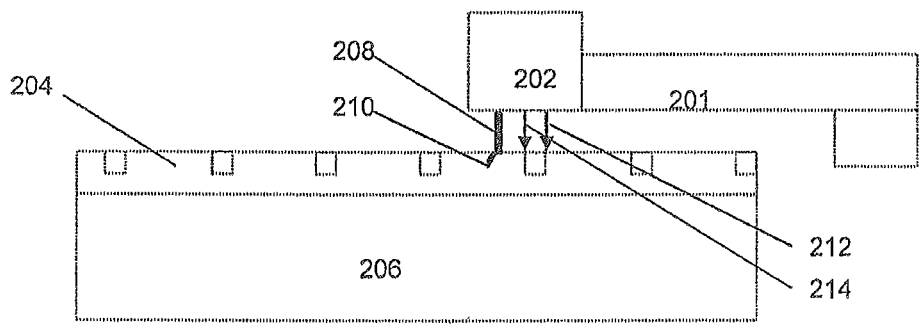
FIG. 2A illustrates a laser delivery unit on a conditioning arm mounted adjacent to a polishing pad on a polish table in accordance with an embodiment of the present invention.
Figure 2B:
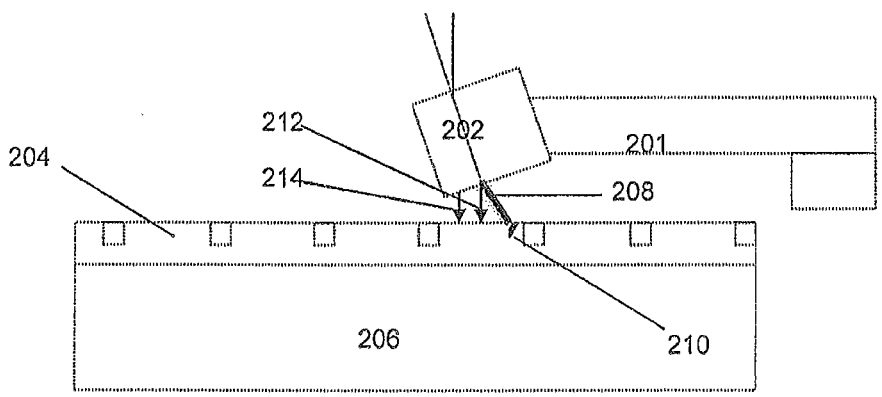
FIG. 2B shows the laser conditioning unit illustrated in FIG. 2A mounted at a non normal angle to the polishing pad.
Figure 2C:
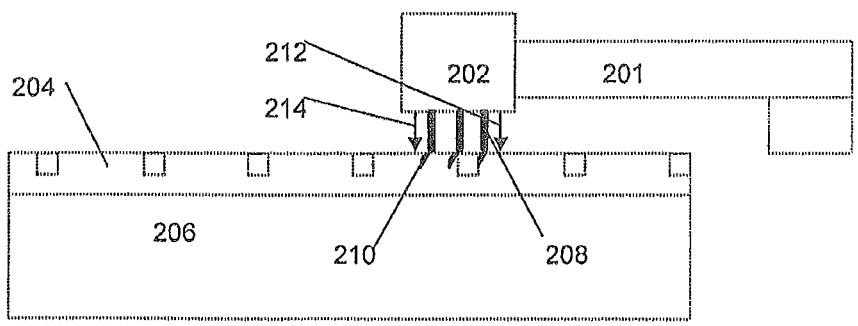
FIG. 2C illustrates the laser conditioning unit with multiple beams incident on the pad.

FIG. 2A illustrates conditioning head 202 mounted on conditioning arm 201, over a polishing pad 204 which is mounted on polish table (platen) 206. Conditioning arm 201 is capable of scanning the radius of pad. Conditioning head 202 also includes connections for a laser source, a fluid delivery unit and a vacuum source. In one embodiment, a laser beam 208 produced by a laser source (which may be mounted within the conditioning head, the conditioning arm, or elsewhere) is made incident on the polishing pad, resulting in microgrooves 210 being cut in the pad surface. Fluid is provided via a fluid-dispense line 212 and debris is removed via vacuum line 214. In another embodiment, discussed further below, the laser is not used to cut the pad surface, but instead to cause fluid particles introduced as an atomized mist above the surface of the pad to explode and thereby cut (texture) the pad surface. FIG. 2B shows the laser-conditioning unit 202 mounted at a non normal angle to the polishing pad. FIG. 2C shows the laser conditioning unit with multiple beams incident on (or, alternatively, near) the surface of the pad.

Figure 3:
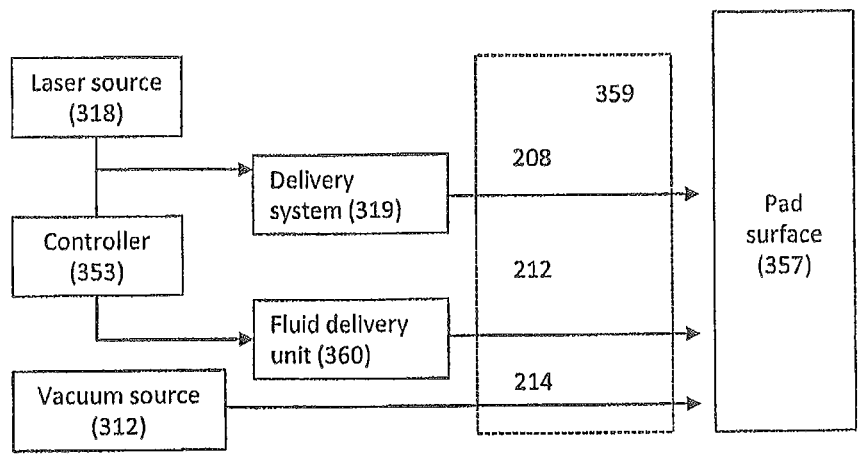
FIG. 3 illustrates a polishing pad conditioning apparatus configured according to an embodiment of the present invention.

FIG. 3 shows a block diagram of a laser conditioning system configured in accordance with an embodiment of the present invention. A laser source 318 is coupled to a delivery system (e.g., a fiber optic guide) 319, which routes and focuses the laser beam. The delivery system 319 for delivering the electromagnetic energy includes a fiber optic energy guide or equivalent which attaches to the laser source and travels to the desired work site. Fiber optic cables or waveguides are typically long, thin and lightweight, and are easily manipulated. Fiber optic cables can be made of calcium fluoride (CaF), calcium oxide (CaO2), zirconium oxide (ZrO2), zirconium fluoride (ZrF), sapphire, hollow waveguide, liquid core. TeX glass, quartz silica, germanium sulfide, arsenic sulfide, germanium oxide (GeO2), and other materials. Other delivery systems include devices comprising mirrors, lenses and other optical components where the energy travels through a cavity, is directed by various mirrors, and is focused onto the targeted cutting site with specific lenses.

The focusing unit 208, fluid delivery line 212 and vacuum lines 214 are all separately and directly connected to the laser conditioning head assembly 359. Polishing pad 357 lies within an interaction zone so as to receive the laser beam at maximum intensity.

In operation, the laser energy exits the delivery system 319 and is applied to the pad surface according to a predetermined (e.g., programmed) conditioning cycle. A controller 353, which may include a computer processor and a memory storing instructions for directing the operation of the laser conditioning unit, may be used for this purpose. Fluid, which may be an air and water mixture, travels along line 212, and is directed at or near the same location as the laser beam. The fluid contacts and cools the pad surface as it is being cut and helps to remove materials cut by the laser.

Water is generally used in a variety of laser cutting operations in order to cool the target surface. Additionally, water is used in the initial pad surface preparation, also called pad break-in operations, for cooling the pad and removing cut materials therefrom. During or between polishing operations, pad conditioning processes use water or slurry during conditioning operations depending on whether conditioning is being performed during or in-between polishing operations. In the case of metal polishing, such as copper polishing, pad cleaning solutions may also be used.

Figure 4:
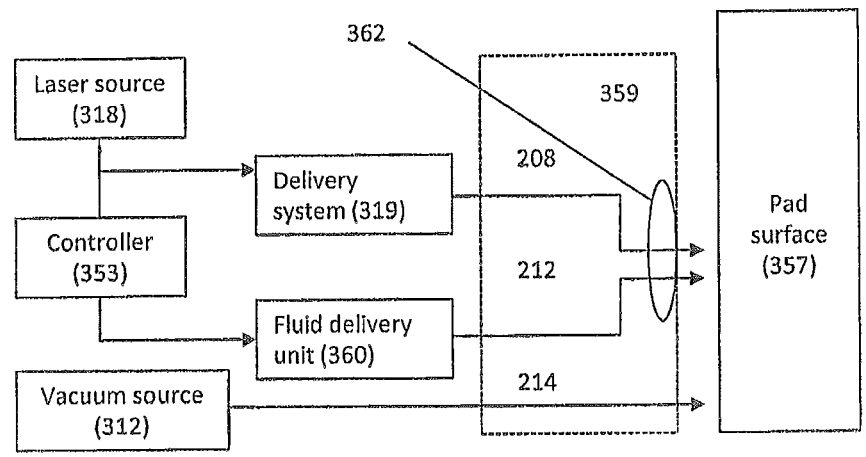
FIG. 4 illustrates an alternative polishing pad conditioning apparatus using conditioned fluid, according to a further embodiment of the present invention.

FIG. 4 shows an alternative arrangement of the conditioning head. In this arrangement laser beam 208 is directed into an interaction zone 362 located in proximity to or within the conditioning head, into which a fluid stream 212 is also introduced. The fluid stream absorbs a portion of the energy of the laser beam and is imparted at a high velocity onto the surface 357 of the polishing pad, thereby cutting, and hence conditioning, the surface. A fluid conditioning system (which may be part of the fluid delivery system 360 or separate therefrom) provides a means to mix liquid and air to atomize the fluid stream as well as to mix additives, such as pad cleaning solutions or pH adjustments, into deionized water. As discussed below, the fluid delivery unit 360 may include an atomizer (e.g., with compressed air or gas) for delivering user-specified combinations of atomized fluid particles into the interaction zone 362. The atomized fluid particles are conditioned, according to the present invention, and may include pad cleaning solutions, slurry, or suitable acidic or basic solutions.

According to one aspect of the present invention, a mist of atomized particles is placed into a volume of air above the pad surface to be conditioned, and a laser source is focused into the volume of air. The laser has a wavelength that is substantially absorbed by the atomized particles in the volume of air. This absorption of the laser energy by the atomized particles causes the atomized particles to explode and impart mechanical cutting forces onto the surface of the polishing pad undergoing conditioning. Accordingly, the laser does not directly cut the pad surface, rather, the exploded fluid particles are used to create a texture on the pad surface. These fluid particles may be conditioned with specific additives such as pad cleaning agents, film polishing fluids, pH adjustments, and other agents, as discussed above.

Since the laser energy is focused directly on the atomized, conditioned fluid particles, the cutting forces may be changed, depending upon the conditioning of the atomized fluid particles. The mechanical cutting efficiency is proportional (related) to the absorption of the laser energy by the fluid particles. The absorption characteristics can be modified by changing the fluid's composition. The fluids used for cooling a pad conditioning site and/or removing pad debris may further include chemical constituents for pad cleaning or film polishing.

According to an aspect of the present invention, the laser energy from delivery unit 319 is focuses onto atomized fluid in the interaction zone 362. Atomized fluid particles in the air absorb energy from the laser and explode. The explosive forces from these atomized fluid particles impart mechanical cutting forces onto the surface of the pad.

Intense energy is emitted from the delivery system 319. In embodiments of the invention, the laser source may be an erbium, chromium, yttrium, scandium, gallium garnet (Er, Cr:YSGG) solid state laser. A $CO_2$ laser may also be used. When fluids besides mere water are used, the absorption of the light energy changes and cutting efficiency is thus affected. Laser systems of different wavelengths, such as neodymium yttrium aluminum garnet (Nd:YAG) lasers, may be selected to allow for high energy absorption by the fluid. Many of the above-discussed additives to the atomized fluid may change the absorption of the laser energy into the atomized fluid particles in the laser-induced mechanical cutting environment. Accordingly, the type of conditioning afforded by these fluid additives may affect the pad surface cutting ability of the system.

A pad conditioning apparatus configured in accordance with the present invention may have one or more laser sources such as those discussed above each with at least one laser beam incident on or near the pad surface. The laser conditioning system is configured to traverse the surface of the polishing pad with the laser beam(s) in order to effect a micro groove pattern on the pad using any or at of the pad surface cutting techniques described above. The beam(s) may be directed so as to be at any angle to the plane defined by the surface of the polishing pad as it rotates on the platen. In some instances, pad conditioning may be conducted at the same time as the pad is used for polishing substrates or other items (in situ conditioning), while in other cases condition may be performed between substrate polishing operations (ex-situ conditioning).

Accordingly, in one embodiment of the invention, a polishing pad conditioning head of a polishing pad conditioning apparatus is brought in close proximity to a polishing pad surface while the polishing pad is being used to polish a wafer by pressing the wafer against the polishing pad. The polishing pad conditioning apparatus provides at least one (although sometimes more than one) laser beam and a fluid stream directed at the polishing pad and a vacuum for removing debris from a vicinity of the polishing pad near the polishing pad conditioning head. In this way, surface micro grooves on the polishing pad are continually refreshed by action of the polishing pad conditioning head while the polishing pad polishes the wafer. An alternative embodiment involves polishing a first wafer using a polishing pad by pressing the first wafer against a polishing surface of the polishing pad. Upon completion of the polishing (or during a pause in the polishing), a polishing pad conditioning head of a polishing pad conditioning apparatus is brought in close proximity to the polishing surface of the polishing pad surface and at least one (though sometimes more than one) laser beam and a fluid stream are directed at the polishing surface of the polishing pad. A vacuum or suction is provided for removing debris from a vicinity of the polishing pad near the polishing pad conditioning head. In this way, surface micro grooves on the polishing surface of the polishing pad are refreshed. Upon completion of the refreshing of the surface micro grooves (though in some cases only a portion of the polishing surface is refreshed) a second wafer is polished using the polishing pad (or polishing of the original wafer continues).

Thus, a polishing pad conditioning apparatus and method have been described. In various embodiments, the apparatus includes a laser beam generating unit along with means to transmit and/or focus a laser beam produced thereby, a fluid delivery system for providing a fluid stream and a vacuum line for removing debris. The laser beam may directly impinge on a polishing pad surface thereby creating cutting action, while an atomized fluid stream provides cooling and pad debris along with fluid are removed thru the vacuum line. In another embodiment, the laser beam is combined with the atomized fluid stream in a region above the pad surface and substantially imparts part of its energy to the fluid stream, generating high energy droplets which provide "cool" cutting action on the pad surface. The beam delivery system along with the atomized fluid line and vacuum line (together integrated in a laser conditioning head), are mounted on a moveable arm, such that the laser beam may be oriented at an angle (e.g., perpendicular or other than perpendicular) to a plane defined by the surface of the polishing pad, which is mounted on a polishing platen. The conditioning arm is capable of moving across the polishing platen to scan the pad radius, allowing the laser to traverse the pad radius. The beam is incident on the pad, creating a local deformation, the depth and shape of the deformation depending on the beam spot size and energy. The beam may be traversed across the pad, while the pad is rotated on the platen, in a predetermined trajectory creating a desired micro grooving pattern covering the entire pad. The rotation speed of the pad, traversing speed of the laser conditioning head, and rotation speed of the laser head unit itself can be varied to provide the desired micro groove pattern.

In varying embodiments of the present invention, the laser beam is mounted off center from the conditioning head and is capable of rotation, which, when combined with pad rotation and the traversing motion of the conditioning unit, can create multiple micro grooving patterns. In yet another embodiment, multiple beams may be generated using a beam splitter, mounted on the conditioning head, enabling multiple points to create the micro grooving texture rapidly and more uniformly.

In other embodiment, the laser beam may impinge the pad at a non-normal angle. This creates an angled microgroove pattern, which may be desirable in certain cases.

Although exemplary embodiments of the invention have been shown and described, many other changes, modifications and substitutions, in addition to those set forth above may be made by one having ordinary skill in the art without necessarily departing from the spirit and scope of this invention.

While the foregoing is directed to embodiments of the present invention, other and further embodiments of the invention may be devised without departing from the basic scope thereof, and the scope thereof is determined by the claims that follow.

What is claimed is:

1. A CMP conditioning apparatus comprising:
   a polish table configured to support a CMP pad while polishing a wafer; and
   a laser beam generation unit disposed adjacent the polishing table, the laser beam generation unit configured to condition the CMP pad while on the polishing table, and while or between polishing wafers on the CMP pad.

2. The apparatus as in claim 1, wherein the laser team generation unit is configured to generate a laser beam of sufficient power to create a local deformation in the CMP pad.

3. The apparatus as in claim I further comprising:
   a conditioning arm configured to traverse the polish table.

4. The apparatus as in claim 3, wherein the laser beam generation unit comprises:
   a laser source mounted on the conditioning arm.

5. The apparatus as in claim 3, wherein the laser beam generation unit comprises:
   a laser source not mounted on the conditioning arm.

6. The apparatus as in claim 1, wherein the laser beam generation unit comprises one of a diode, a $CO_2$ or a solid state laser source.

7. A CMP conditioning apparatus for conditioning a CMP pad disposed on a polish table, the apparatus comprising:
   a laser source configured to generate laser beam capable of creating a local deformation in the CMP pad; and
   a conditioning arm positionable to direct laser beam from the laser source while in-situ conditioning the CMP pad.

8. The apparatus as in claim 7, wherein the laser source is mounted on the conditioning arm.

9. The apparatus as in claim 7, in the laser source is not mounted on the conditioning arm.

10. A method for conditioning a polishing pad mounted on a polishing table of a CMP, the method comprising:
    during or after polishing a wafer on the polishing pad, directing a laser beam onto a surface of the polishing pad mounted on the polishing table of the CMP; and
    creating a local deformation in the polishing pad with the laser beam.

11. The method of claim 10, wherein directing comprises:
    traversing the laser beam across the polishing pad.

12. The method of claim 10, wherein directing comprises:
    moving a condition arm across a polish table supporting the polishing pad.

13. The method claim 10, wherein creating the local deformation in the polishing pad comprises:
    creating a micro grooving pattern.

14. The method of claim 10, wherein directing comprises:
    directing multiple laser beams onto the surface of the polishing pad.

15. A CMP system comprising a polishing table for supporting a CMP pad on which a semiconductor wafer is polished, wherein the improvement comprises:
    a laser source configured to regenerate the CMP pad through a conditioning process while the CMP pad is disposed on the polishing table.

16. The system as in claim 15, wherein the laser source is deposed in a laser beam generation unit disposed adjacent the polishing table.

17. The system as in claim 15, the laser source is configured to generate a laser beam of sufficient power to create a local deformation in the CMP pad.

18. The system as in claim 15 further comprising:
a conditioning arm configured to traverse the polish table while directing a beam generated by the laser source.

19. The system as in claim 18, wherein the conditioning arm is configured to direct the laser beam across the polishing table at a rate of 1-500 mm/sec.

20. The system as claim 15, wherein the laser source is one of a diode, a $CO_2$ or a solid state laser source.

21. The system as in claim 15, wherein the laser source is not mounted on the conditioning arm.

* * * * *

UNITED STATES PATENT AND TRADEMARK OFFICE
CERTIFICATE OF CORRECTION

| | | |
|---|---|---|
| PATENT NO. | : 9,162,344 B2 | |
| APPLICATION NO. | : 13/785845 | |
| DATED | : October 20, 2015 | |
| INVENTOR(S) | : Rajeev Bajaj | |

It is certified that error appears in the above-identified patent and that said Letters Patent is hereby corrected as shown below:

In the Specification:

In Detailed Description:

Column 6, Line 46, please delete "at" and insert -- al -- therefor;

In the Claims:

Column 8, Claim 2, Line 13, please delete "team" and insert -- beam -- therefor;

Column 8, Claim 3, Line 16, please delete "I" and insert -- 1 -- therefor;

Column 8, Claim 7, Line 30, please insert -- a -- after generate;

Column 8, Claim 7, Line 32, please insert -- the -- after direct;

Column 8, Claim 9, Line 36, please delete "in" and insert -- wherein -- therefor;

Column 8, Claim 13, Line 50, please insert -- of -- after method;

Column 9, Claim 20, Line 7, please insert -- in -- after as.

Signed and Sealed this
Fifteenth Day of March, 2016

Michelle K. Lee
*Director of the United States Patent and Trademark Office*